United States Patent
Jecker et al.

(10) Patent No.: US 7,450,738 B2
(45) Date of Patent: Nov. 11, 2008

(54) METHOD AND COMPUTER PROGRAM FOR THE DETECTION OF THE CONTOUR OF AN OBSTACLE IN THE SURROUNDINGS OF A VEHICLE

(75) Inventors: Nicolas Jecker, Esslingen (DE); Heinrich Gotzig, Heilbronn (DE)

(73) Assignee: Valeo Schalter und Sensoren GmbH, Bietigheim-Bissingen ( * ) Notice: Subject to any disclaimer, the term of this patent is extended or adjusted under 35 U.S.C. 154(b) by 132 days.

(21) Appl. No.: 10/571,096

(22) PCT Filed: Jul. 8, 2004

(86) PCT No.: PCT/EP2004/007507

§ 371 (c)(1), (2), (4) Date: Mar. 8, 2006

(87) PCT Pub. No.: WO2005/033736

PCT Pub. Date: Apr. 14, 2005

(65) Prior Publication Data

US 2007/0030347 A1 Feb. 8, 2007

(30) Foreign Application Priority Data

Sep. 12, 2003 (DE) ................. 103 43 331

(51) Int. Cl.
  G06K 9/00 (2006.01)
  G01C 22/00 (2006.01)
(52) U.S. Cl. ....................... 382/104; 701/23
(58) Field of Classification Search ................. 382/104, 382/106, 107, 226, 266; 701/11–12, 23, 701/41, 42–43, 300–302
See application file for complete search history.

(56) References Cited

U.S. PATENT DOCUMENTS

| | | | |
|---|---|---|---|
| 5,765,116 A * | 6/1998 | Wilson-Jones et al. | 701/41 |
| 5,790,403 A * | 8/1998 | Nakayama | 701/28 |
| 6,292,725 B1 * | 9/2001 | Kageyama et al. | 701/30 |
| 6,442,476 B1 * | 8/2002 | Poropat | 701/207 |
| 6,832,156 B2 * | 12/2004 | Farmer | 701/301 |
| 7,049,945 B2 * | 5/2006 | Breed et al. | 340/435 |
| 7,248,153 B2 * | 7/2007 | Danz et al. | 340/435 |

(Continued)

FOREIGN PATENT DOCUMENTS

DE    697 10 579    2/2002

(Continued)

*Primary Examiner*—Brian Q Le
(74) *Attorney, Agent, or Firm*—Paul Vincent

(57) ABSTRACT

The invention relates to a method for detecting the contour of an obstacle in the surroundings of a moving vehicle by means of a sensor device that is preferably integrated in the lateral area of the vehicle. In previously known methods of this type, the sensor device usually emits a sensor signal to the obstacle already when said obstacle lies ahead in the direction of travel while also emitting a sensor signal once the vehicle has passed the obstacle. In order to improve evaluation of the sensor signals with regard to the reflection thereof on the obstacle, the reflection signals thus generated are first mathematically averaged so as to be able to then derive in a more precise manner the actual position and the actual shape of the contour of the obstacle from the obtained averaged reflection signal.

12 Claims, 3 Drawing Sheets

U.S. PATENT DOCUMENTS

2002/0169537 A1  11/2002  Regensburger et al.
2003/0004644 A1*  1/2003  Farmer ....................... 701/301
2004/0158355 A1*  8/2004  Holmqvist et al. .......... 700/245

FOREIGN PATENT DOCUMENTS

| | | |
|---|---|---|
| DE | 101 46 712 | 4/2003 |
| DE | 101 48 289 | 4/2003 |
| EP | 0 783 114 | 7/1997 |
| EP | 1 333 296 | 8/2003 |
| JP | 6 127 318 | 5/1994 |
| WO | WO 2004/042423 | 5/2004 |

* cited by examiner

METHOD AND COMPUTER PROGRAM FOR THE DETECTION OF THE CONTOUR OF AN OBSTACLE IN THE SURROUNDINGS OF A VEHICLE

This application is the national stage of PCT/EP2004/007507 filed on Jul. 8, 2004 and also claims Paris Convention priority of DE 103 43 331.7 filed on Sep. 12, 2003.

BACKGROUND OF THE INVENTION

The invention relates to a method and a computer program for detecting the contour of an obstacle in the surroundings of a moving vehicle using a sensor means which is preferably disposed in a side area of the vehicle. The invention also relates to a computer program and a parking space detecting device for performing this method.

A parking aid for vehicles is conventionally known, in particular from DE 101 46 712 A1. It comprises two distance sensors providing two sensor signals of different beam geometries, which generate together a directional characteristic with a cross lobe. These sensor means are preferably disposed in the side area of a vehicle. In this cross lobe configuration, one of the sensors has a wide beam lobe in a horizontal direction and a narrow beam lobe in a vertical direction. When the vehicle passes an obstacle, at least the following steps are performed:

Emitting a first sensor signal by the sensor means in one direction having a directional portion that lies in the direction of travel of the vehicle, when the obstacle is ahead of the vehicle in the travelling direction.

Receiving at least part of the first sensor signal after reflection thereof on the obstacle in the form of a first reflection signal which represents a first position and a first shape of the contour of the obstacle;

Emitting a second sensor signal by the sensor means in a direction having a directional portion that is opposite to the direction of travel of the vehicle, when the vehicle has passed the obstacle;

Receiving at least part of the second sensor signal after reflection thereof on the obstacle in the form of a second reflection signal which represents a second position and a second shape of the contour of the obstacle; and/or Emitting a third sensor signal by the sensor means in a direction substantially perpendicular to the direction of travel when the passing vehicle is at the position of the obstacle; and Receiving at least part of the third sensor signal after reflection thereof on the obstacle in the form of a third reflection signal which represents a third position and third shape of the contour of the obstacle.

DE 101 46 712 evaluates, in particular, the amplitudes of the reflection signals of the two sensor means which are received when the vehicle is passing the obstacle. The evaluation thereof gives information about the position and shape of the contour of the obstacle.

Departing from the above-mentioned prior art, it is the object of the invention to further develop a conventional method and computer program, as well as a conventional parking space detecting device for detecting the contour of an obstacle in the vicinity of a moving vehicle in such a manner that the position and/or the shape of the contour of the obstacle can be recognized with more precision.

SUMMARY OF THE INVENTION

This object is achieved by the method of the independent claims. To be more precise, the solution of the above-described method lies in the following characterizing steps: generating an averaged reflection signal through mathematical, preferably arithmetical, averaging of at least two of the reflection signals and through evaluation of the averaged reflection signal towards extracting the actual position and/or the actual shape of the contour of the obstacle.

Each individual reflection signal provides rough information about the position and the shape of the contour of the obstacle. The information concerning the position and shape provided by the individual reflection signals only presents a rough indication of the actual position and the actual shape and usually does not exactly correspond therewith. However, the claimed mathematical averaging of at least two of the reflection signals advantageously provides significantly more precise information about the actual position and/or the actual shape of the contour of the obstacle. In principle, the at least two reflection signals used for averaging may be arbitrarily selected. It is, however, recommended to consider, in any case, the third reflection signal for averaging, since it provides very precise conclusions per se about the actual position and the actual shape of the contour of the obstacle.

Further precision can be achieved through suitable weighting of the reflection signals used for mathematical averaging.

The first and second and optionally also third sensor signals fundamentally lie in one plane. The claimed method detects only obstacles which are intersected by the plane. To detect a possible change of the contour shape of the obstacle in the vertical direction, the detection plane can advantageously be inclined relative to its angle with respect to a fictitious vertical plane in the travelling direction of the vehicle and perpendicular to the street surface on which the vehicle is travelling.

The inventive method is advantageously suited for radar, ultrasound or laser light signals.

Further advantageous embodiments of the method are the subject matter of the dependent claims.

The above-mentioned object of the invention is moreover achieved by a computer program and a parking space detecting device for performing the claimed method. The advantages of these solutions correspond to the advantages mentioned above with reference to the claimed method.

BREIF DESCRIPTION OF THE DRAWING

The description includes a total of eight figures, wherein

FIG. 4b shows averaged reflection signals obtained while passing the obstacle shown in FIG. 4a.

DESCRIPTION OF THE PREFERRED EMBODIMENT

The invention is described in detail below using different embodiments with reference to the above-mentioned figures.

Figure 1:
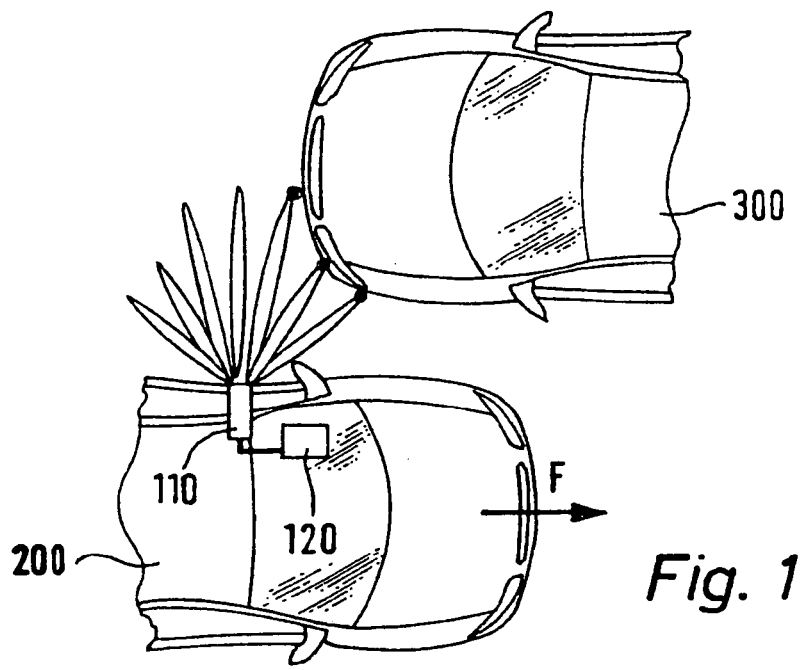
FIG. 1 shows an obstacle in the detection range of a sensor means having horizontal emission characteristics, which is installed in a passing vehicle.

FIG. 1 shows an initial situation for performing the present invention. It shows a vehicle 200 passing an obstacle 300 in the travelling direction F, in particular a parked vehicle. A parking space detecting device is installed in a side area of the passing vehicle 200, which comprises a sensor means 110 for emitting sensor signals and for receiving reflection signals, and an evaluation means 120 for evaluating the reflection signals.

In accordance with the invention, this parking space detecting device functions as follows: At least one first sensor signal is emitted by the sensor means 110 towards the obstacle 300 with a directional portion that lies in the travelling direction F of the vehicle, preferably as long as the obstacle 300 is opposite to and ahead of the vehicle 200 in the travelling direction F. The sensor signal is reflected at the obstacle 300 and at least part of this first sensor signal is then received by the sensor means 110 in the form of a first reflection signal. The first sensor signal represents a first position x1 and a first shape V1 of the contour of the actual obstacle 300.

After the vehicle has passed the obstacle, the sensor means 110 sends a second sensor signal towards the obstacle 300 having a directional portion opposite to the direction of travel of the vehicle 200. At least part of this second sensor signal, which is reflected by the obstacle 300, is received by the sensor means 110 in the form of a second reflection signal. The second reflector signal R2 thereby represents a second position x2 and a second shape V2 of the contour of the obstacle 300. Since the two positions x1 and x2 represented by the two reflection signals, and the two contour shapes V1 and V2, taken alone, are insufficient to represent the actual relationships, they are mathematically, preferably arithmetically, averaged in accordance with the invention.

Figure 2A:
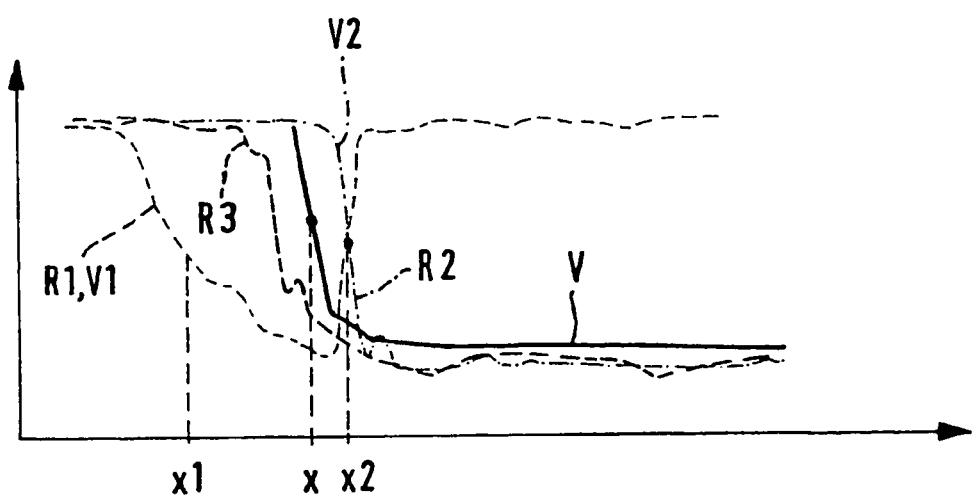
FIG. 2a shows different examples of the contour of an obstacle which would be determined from different reflection signals.
Figure 2B:
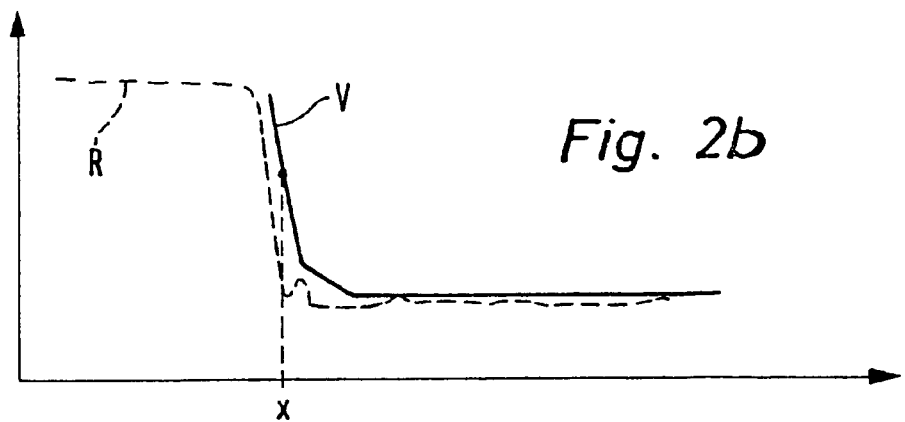
FIG. 2b shows the actual contour of the obstacle in comparison with the shape of the obstacle on the basis of an evaluation of a reflection signal averaged in accordance with the invention.

The averaged reflection signal R obtained in this manner represents the actual position x and the actual shape V of the contour of the obstacle 300 much better than the values obtained from the first or second reflection signal alone. This is shown in FIG. 2b, wherein the dashed black line shows the shape represented by the averaged reflection signal R and the fully drawn black line represents the actual position and actual shape of the contour of the obstacle 300.

A further substantial improvement in the actual position x and the actual contour shape V of the obstacle can be obtained if, in addition to the first and second reflection signals, a third reflection signal R3 is also used for averaging. To obtain the third reflection signal, a third sensor signal is emitted by the sensor means 110 in a direction substantially perpendicular to the direction of travel F and towards the obstacle 300 when the vehicle is at the position of the obstacle 300. The third reflection signal R3 then represents at least part of this third sensor signal after being reflected from the obstacle 300. The third reflection signal R3 is preferably averaged with a higher weighting factor than the first and second reflection signals, since it has turned out to represent more realistic information about the position and the contour of the obstacle 300 compared to the first and second sensor signals. The first and second reflection signals are preferably averaged with the same weighting.

As described above, it is a prerequisite of the present invention that the obstacle 300 is in the detection range of the sensor means 110 when it is ahead of the vehicle 200 in the travelling direction, and also when the vehicle 200 has already passed the obstacle. The first, second and preferably also third sensor signals or reflection signals can therefore be regarded as substantially being in one plane, as indicated in FIG. 1.

Figure 3A:
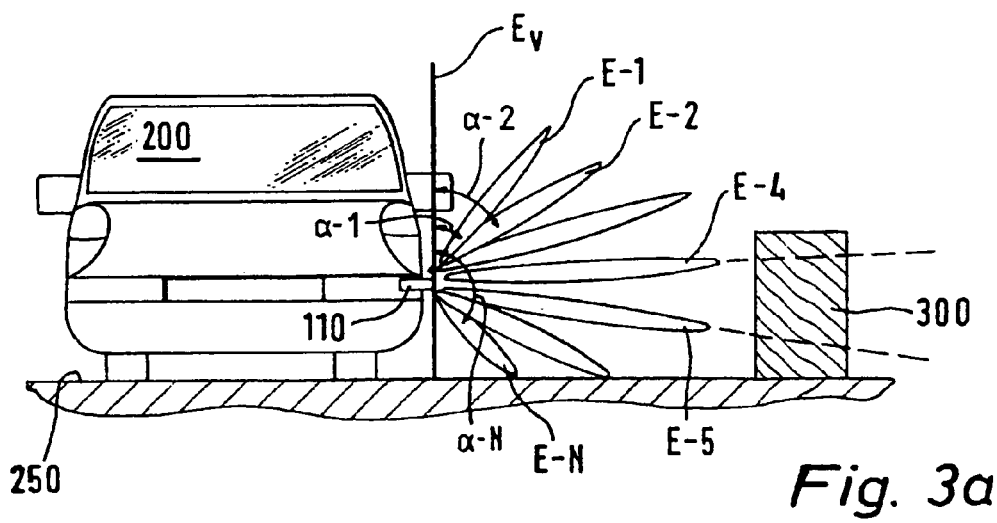
FIG. 3a shows a vehicle passing a first obstacle and comprising a sensor means that emits in different planes.
Figure 3B:
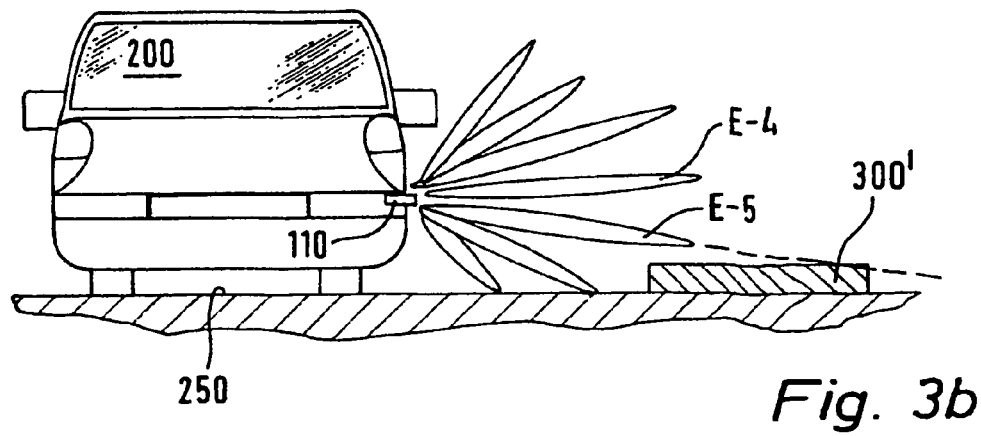
FIG. 3b shows a vehicle passing a second obstacle and comprising a sensor means that emits in different planes.

FIG. 3a shows shape profiles of different angular orientations of this plane, in side view. All possible angular plane orientations E-1 ... -N shown therein differ in position by a differing angle $\alpha$-1 ... -N relative to a fictitious vertical plane $E_v$, which extends in the travelling direction of the vehicle 200, perpendicular to a road surface 250 on which the vehicle is travelling. If the parking space detecting device is designed such that it emits the sensor signals only in one of these planes E-1 ... N, the inventive method also detects only those obstacles 300 which are intersected by the respective plane. In FIG. 3a, the obstacle 300 is intersected e.g. by the planes E-4 and E-5. In contrast thereto, the obstacle 300' shown in FIG. 3b having a smaller height would not be detected if the sensor means is oriented in the plane E-4 but would be detected if it were oriented in plane E-5.

Figure 4A:
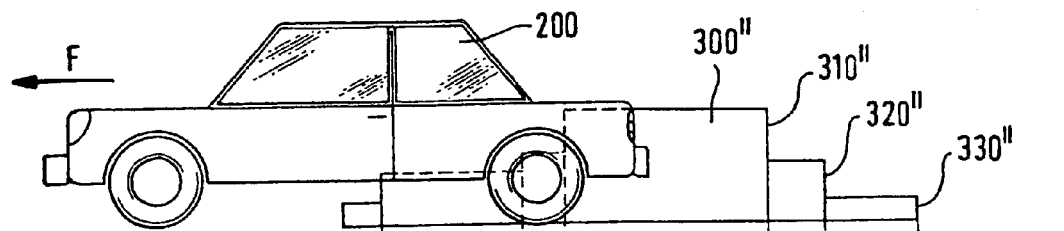
FIG. 4a shows a vehicle passing an obstacle which is stepped in the vertical direction.
Figure 4B:
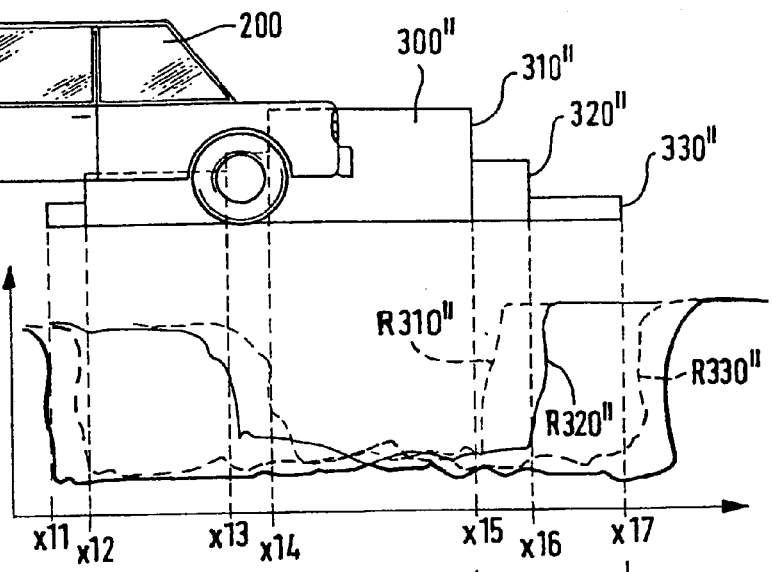
Figure 4C:
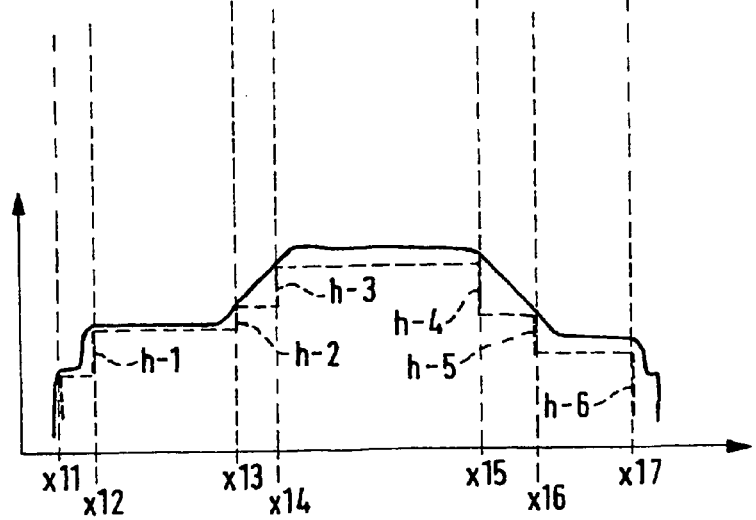
FIG. 4c shows a reconstruction of the contour of the obstacle of FIG. 4a, which is stepped in a vertical direction.

In order to be able to precisely detect obstacles 300 of different heights, the sensor means 110 is advantageously designed such that the sensor signals are emitted not only in one plane but in several planes E-1 ... -N, either simultaneously or temporally offset. When the vehicle 200 passes a stepped obstacle 300" in the travelling direction F (FIG. 4a), the stepped contour shape of the obstacle 300" can be detected with the respective positions of the contours using a sensor means 110 emitting in three dimensions. During application of the inventive method, several reflection signals, in particular, the first, second and third reflection signals are received for each flank 310", 320" and 330" of the stepped obstacle 300", and are subsequently averaged in accordance with the inventive method. The averaged reflection signals R310", R320", R330" represent the actual positions x11 ... to x17 of the flanks of the stepped obstacle 300" to a good approximation. The shapes shown in FIG. 4b of the averaged reflection signals are obtained by emitting the first, second and/or third sensor signal in different respective planes E-1 ... -N. Evaluation of the angle information $\alpha$-1 ... -N by which the positions of the planes of FIG. 4b differ, permits reconstruction of both the separations x11 ... x17 as well as the contour of the stepped obstacle 300" in a vertical direction. In this manner, it is possible to reconstruct, in particular, the heights h1 ... -6 of the obstacle 300".

The sensor means 110 for performing the inventive method must be designed to at least emit sensor signals in one of the planes E-1 ... -N. Advantageously, it can also emit the sensor signals in a third dimension, represented by the angles $\alpha$-1 ... N. Towards this end, it is preferably designed as multi-beam or scanner system.

The inventive method is preferably realized in the form of a computer program. The computer program for a parking space detecting device is stored, possibly together with further computer programs, on a data carrier which can be read by a computer. The data carrier may be a disk, a compact disk, a so-called flash-memory or the like. The computer program stored on the data carrier can then be transferred and sold to a customer in the form of a product. The computer program can be transferred and sold to a customer even without a physical data carrier, e.g. via a communications network, in particular, the internet.

We claim:

1. A method for detecting a contour of an obstacle in a vicinity of a moving vehicle using a sensor means preferably installed in a side area of the vehicle, the method comprising steps of:

a) emitting a first sensor signal, using the sensor means, in a direction having a directional portion in a travelling direction of the vehicle when the obstacle is ahead of the vehicle in the travelling direction;

b) receiving at least part of the first sensor signal after reflection thereof from the obstacle, in a form of a first reflection signal that represents a first position and a first shape of a contour of the obstacle;

c) emitting a second sensor signal, using the sensor means, in a direction having a directional portion opposite to the travelling direction of the vehicle when the vehicle has passed the obstacle;

d) receiving at least part of the second sensor signal, after reflection thereof from the obstacle, in a form of a second reflection signal that represents a second position and a second shape of the contour of the obstacle;

e) generating an averaged reflection signal through mathematical or arithmetical averaging of the first and the second reflection signals; and f) evaluating an averaged reflection signal to extract an actual position and actual shape of the contour of the obstacle.

2. The method of claim 1, wherein the sensor signals are radar signals, ultrasound signals, or laser light signals.

3. A computer readable medium having a program code, the computer program code being designed for performing the method of claim 1.

4. The computer readable medium of claim 3, wherein a parking space is detected.

5. A method for detecting a contour of an obstacle in a vicinity of a moving vehicle using a sensor means preferably installed in a side area of the vehicle, the method comprising steps of:

a) emitting a first sensor signal, using a sensor means, in a direction having a directional portion in a travelling direction of the vehicle when the obstacle is ahead of the vehicle in the travelling direction;

b) receiving at least part of the first sensor signal after reflection thereof from the obstacle, in a form of a first reflection signal that represents a first position and a first shape of a contour of the obstacle;

c) emitting a second sensor signal, using the sensor means, in a direction having a directional portion opposite to the travelling direction of die vehicle when the vehicle has passed the obstacle;

d) receiving at least part of the second sensor signal, after reflection thereof from the obstacle, in a form of a second reflection signal that represents a second position and a second shape of the contour of the obstacle;

e) emitting a third sensor signal, using the sensor means, in a direction substantially perpendicular to the travelling direction when the vehicle is located at a substantially same position as the obstacle;

f) receiving at least part of the third sensor signal, after reflection thereof from the obstacle, in a form of a third reflection signal that represents a third position and a third shape of the contour of the obstacle;

g) generating an averaged reflection signal through mathematical or arithmetical averaging of at least two of the first, second and third reflection signals; and h) evaluating an averaged reflection signal to extract an actual position and actual shape of the contour of the obstacle.

6. The method of claim 5, wherein the first, second and third reflection signals are used with individual weighting factors in averaging in accordance with step g).

7. The method of claim 6, wherein the third reflection signal is weighted more than the first and second reflection signals.

8. The method of claim 7, wherein the first and the second reflection signals are weighted by a same amount.

9. The method of claim 5, wherein the first, second and third reflection signals are substantially co-planar.

10. The method of claim 9, further comprising repeating steps a) through h) for different angular positions of a plane relative to a vertical plane in a longitudinal direction of the vehicle.

11. The method of claim 5, wherein the first, second and third sensor signals are emitted at a substantially same time.

12. A vehicle parking space detecting device to detect a contour of an obstacle in a surroundings of the vehicle and while the vehicle is moving, the device comprising:

a) means for emitting a first sensor signal, using the sensor means, in a direction having a directional portion in a travelling direction of the vehicle when the obstacle is ahead of the vehicle in the travelling direction;

b) means for receiving at least part of the first sensor signal after reflection thereof from the obstacle, in a form of a first reflection signal that represents a first position and a first shape of a contour of the obstacle;

c) means for emitting a second sensor signal, using the sensor means, in a direction having a directional portion opposite to the travelling direction of the vehicle when the vehicle has passed the obstacle;

d) mean for receiving at least part of the second sensor signal, after reflection thereof from the obstacle, in a form of a second reflection signal that represents a second position and a second shape of the contour of the obstacle;

e) means for generating an averaged reflection signal through mathematical or arithmetical averaging of the first and the second reflection signals; and f) means for evaluating an averaged reflection signal to extract an actual position and actual shape of the contour of the obstacle.

* * * * *